United States Patent
Nedelman (10) Patent No.: US 9,828,222 B2
(45) Date of Patent: Nov. 28, 2017

(54) VEHICLE STORAGE AREA LIFT ASSEMBLY

(71) Applicant: FORD GLOBAL TECHNOLOGIES, LLC, Dearborn, MI (US)

(72) Inventor: Marc David Nedelman, Waterford, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 279 days.

(21) Appl. No.: 14/592,946

(22) Filed: Jan. 9, 2015

(65) Prior Publication Data

US 2016/0200558 A1 Jul. 14, 2016

(51) Int. Cl.
- *B65F 3/00* (2006.01)
- *B66F 7/06* (2006.01)
- *B65G 67/24* (2006.01)

(52) U.S. Cl.
CPC ............ *B66F 7/0683* (2013.01); *B65G 67/24* (2013.01); *B66F 7/065* (2013.01); *B65G 2814/0313* (2013.01)

(58) Field of Classification Search
CPC ....................................................... A61G 3/06
USPC ................................ 414/462, 540, 546, 917
See application file for complete search history.

(56) References Cited

U.S. PATENT DOCUMENTS

| | | | |
|---|---|---|---|
| 4,455,948 A | 6/1984 | Torres | |
| 4,799,849 A | 1/1989 | Miller | |
| 4,969,793 A | 11/1990 | Pawl | |
| 5,301,992 A | 4/1994 | Whitmore | |
| 7,179,040 B2* | 2/2007 | Masuda | B60R 5/04 187/211 |
| 2004/0160076 A1 | 8/2004 | Masuda et al. | |
| 2013/0270858 A1* | 10/2013 | Gaudig | B60R 5/04 296/184.1 |

FOREIGN PATENT DOCUMENTS

WO 2007/143874 A1 12/2007

OTHER PUBLICATIONS

English machine translation of WO2007/143874.

* cited by examiner

*Primary Examiner* — Anna Momper
*Assistant Examiner* — Willie Berry, Jr.
(74) *Attorney, Agent, or Firm* — Vichit Chea; King & Schickli, PLLC (57) ABSTRACT

A lift assembly for a utility vehicle storage area includes a floor supported by a scissor mechanism, an actuator for raising the scissor mechanism and the floor from a neutral position to an elevated position, a plurality of rollers attached to the floor, guide members attached to the scissor mechanism and within which the plurality of rollers move, and a detent protruding into one of the guide members to resist rotation of at least one of the plurality of rollers and create a pivot point about which the floor rotates to a pivoted position. The floor may be rotated to the pivoted position from the neutral position, the elevated position, or any position between the neutral and elevated positions. In addition, the floor may be removed from the assembly by passing the first and second pairs of rollers through the cutouts in the guide members.

20 Claims, 9 Drawing Sheets

VEHICLE STORAGE AREA LIFT ASSEMBLY

TECHNICAL FIELD

This document relates generally to lift floors, and more particularly to lift floors positioned in utility vehicle storage areas.

BACKGROUND

Getting cargo into and out of vehicle storage areas is an age old dilemma for vehicle owners. Bulky cargo is difficult to maneuver into the storage area and difficult to position once inside the storage area. Similarly, heavy cargo can be difficult to lift from ground level to a lip of the storage area, and is often at least as difficult to lower onto the floor of the storage area. Further difficulty can be encountered when removing bulky or heavy cargo from the storage area.

In order to overcome and alleviate some of the issues in this area, the prior art discloses several mechanisms for raising and lowering a floor within a storage area such as the trunk of an automobile. One example of the prior art includes the lifting mechanism described in U.S. Pat. No. 4,969,793 to Pawl. The mechanism includes a power-operated lift that is adapted to be mounted over a wheel well covering a portion of an automobile trunk. The lift has linkages for raising or lowering a load-supporting floor with respect to the trunk floor in a vertical direction. The load-supporting floor can also be manually moved in a horizontal direction in order to remove the load from the trunk and pivoted about the attached supporting frame when the load-supporting floor is positioned on the trunk floor. Pivoting the load-supporting floor in this manner provides access to the wheel well portion of the trunk floor positioned beneath the load-supporting floor.

While the prior art lift mechanisms are sufficient to provide assistance with loading and unloading cargo into an automobile's storage area and providing access to the wheel well including the spare tire and related tools, specific vehicle designs demand even more functionality from such mechanisms. With the advent of utility vehicles, such as sport utility vehicles and crossover utility vehicles, for example, the footprint of the area available for storage has decreased when compared to the more traditional automobile storage areas. The smaller footprint is created primarily by the narrowing of the storage area from the rear of the utility vehicles inward in order to accommodate additional passenger space within the vehicle (e.g., third row seating). In order to maintain a sufficient square footage for cargo storage, the storage areas are necessarily deeper from top to bottom than previous storage areas.

As a result, the storage area designs of utility vehicles generally result in the stacking of belongings and, more importantly, placing an initial layer of belongings on a floor of the storage area which is often below the upper lip of an access area adjacent a rear lift gate. Depending on the platform on which the utility vehicle is built, the floor of the storage area where the initial layer of belongings are placed may be significantly below the upper lip creating even greater challenges when loading heavy and/or bulky cargo and unloading same.

Given the size limitations of utility vehicle storage areas, modern lift mechanisms should be designed to maximize the storage area footprint by covering a maximum portion of the footprint with a load-supporting floor instead of a central portion of the storage area as shown in the Pawl patent. Utilization of substantially the entirety of the storage area floor, however, results in limited access within the cargo area for service or access to a spare tire compartment and further limits the available storage area. In today's sports utility and crossover utility vehicles, it is therefore desirable for the load-supporting floor of the lift mechanism to be removable from the vehicle.

Removing the floor provides greater ease of access to wiring for vehicle lights, power outlets, and speakers, for example, which are often positioned within or are directly adjacent the storage area of utility vehicles and often require access for service. Even more, although the floor can be pivoted to provide access to a spare time compartment, some customers prefer to remove the load-supporting floor to access the spare time and related tools instead of finessing the spare tire out from underneath the pivoted floor and over the elevated access lip of the storage area. This is particularly the case in utility vehicles with a lowered storage area floor. Still, other customers desire to simply remove the load-supporting floor to gain additional cargo storage volume when required.

This document relates to a lift assembly for a utility vehicle storage area that provides a floor capable of raising and lowering cargo within the storage area. Even more, the lift assembly utilizes rollers to create a pivot point around which the floor pivots to allow access to a wheel well and spare time. Utilizing the rollers in this manner allows the floor to be removed when desired simply by lifting the floor from the storage area. Advantageously, this allows for the floor to be separated from the lift assembly and completely removed from the utility vehicle when desired. This removal provides easier access to the spare tire compartment within the storage area and allows for easier access to underlying wiring and systems within the vehicle for service.

SUMMARY

In accordance with the purposes and benefits described herein, a lift assembly for a utility vehicle storage area is provided. The lift assembly may be broadly described as comprising a floor supported by a scissor mechanism, and an actuator for raising the scissor mechanism and the floor from a neutral position to an elevated position. Guide members may be attached to the scissor mechanism within which a plurality of rollers, attached to the floor, move. A detent protruding into one of the guide members to resist rotation of at least one of the plurality of rollers may be provided which creates a pivot point about which the floor rotates to a pivoted position.

In other possible embodiments, the floor may be rotated to the pivoted position from the neutral position, the elevated position, or any position between the neutral and elevated positions.

In one possible embodiment, the scissor mechanism includes at least one lateral cross brace. In another embodiment, the plurality of rollers may be attached to an underside of the floor including a first pair of rollers attached adjacent a rear edge of the floor and a second pair of rollers attached apart from said first pair of rollers between a front edge and the rear edge of said floor.

In still another possible embodiment, the guide members include a cutout through which the second pair of rollers pass when the floor is rotated to the pivoted position. Even more, the first pair of rollers also passes through the cutouts when removing the floor from the lift assembly.

In another possible embodiment, the first and second pairs of rollers may be positioned within the guide members, and at least one of the rollers in the first pair of rollers is in contact with the detent and the second pair of rollers is adjacent the cutouts, in the neutral position and the elevated position. Similarly, the first and second pairs of rollers may be positioned within the guide members and the at least one of the plurality of rollers is not in contact with the detent in an extended position.

In another possible embodiment, the scissor mechanism may include a pair of first and second pivotally connected supports, and a base, the first supports attached adjacent a first end to the base and attached adjacent a second end to the guide member, and the second supports having a member attached adjacent a first end for movement along the base and attached adjacent a second end to the guide member.

In another possible embodiment, the base may include a pair of elongated channels, and the member attached adjacent the first end of the second supports is a roller which moves within the elongated channels.

In still another possible embodiment, at least one of the first and second pivotally connected supports may include a channel within which at least a portion of the actuator is positioned in the neutral position.

In one other possible embodiment, the floor may rotate to a pivoted position from the neutral position, the elevated position, or any position between the neutral and elevated positions. Even more, the scissor mechanism may include at least one lateral cross brace.

In one possible embodiment, the plurality of rollers may be attached to an underside of the floor including a first pair of rollers attached adjacent a rear edge of the floor and a second pair of rollers attached between a front edge and the rear edge of the floor. The guide members may include a cutout through which the second pair of rollers pass when the floor is rotated to the pivoted position, and the first and second pairs of rollers pass through the cutouts when removing the floor from the lift assembly. The storage area lift assembly may be included in a utility vehicle.

In another possible embodiment, a lift assembly for a utility vehicle storage area includes a removable floor, a pair of first and second pivotally connected supports supporting the removable floor, and a base. Each of the first supports are attached adjacent a first end to the base and attached adjacent a second end to a guide member. Each of the second supports have a roller attached adjacent a first end for movement along the base and are attached adjacent a second end to the guide member. The assembly further includes an actuator for raising and lowering the pair of first and second pivotally connected supports and the removable floor, a plurality of rollers attached to the removable floor for movement within the guide members, and a detent protruding into one of the guide members to resist rotation of at least one of the plurality of rollers and create a pivot point about which the floor rotates to a pivoted position.

In accordance with an additional aspect, a method is provided of removing a floor from a lift assembly of a utility vehicle storage area. The method may be broadly described as comprising the steps of: (a) actuating a scissor mechanism supporting the floor to move the floor to a removal position; (b) pivoting the floor from the removal position to a pivoted position; (c) applying a force to the floor sufficient to release a roller attached adjacent a rear edge of the floor and positioned within a guide member attached to the scissor mechanism from a detent; (d) maintaining the force until the roller is adjacent a cutout in the guide member; and (e) lifting a rear edge of the floor such that the attached roller passes through the cutout in the guide member.

In one possible embodiment, the step of pivoting includes lifting a front edge of the floor such that a second roller attached between a front edge and the rear edge of the floor passes through the cutout in the guide member prior to the step of applying a force.

In another possible embodiment, the method may include the additional step of bracing the scissor mechanism with at least one lateral support.

In the following description, there are shown and described several preferred embodiments of the lift assembly for a utility vehicle storage area and the related method. As it should be realized, the assemblies and methods are capable of other, different embodiments and their several details are capable of modification in various, obvious aspects all without departing from the systems and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the lift assembly and together with the description serve to explain certain principles thereof. In the drawing figures.

Reference will now be made in detail to the present preferred embodiments of the lift assembly, examples of which are illustrated in the accompanying drawing figures.

DETAILED DESCRIPTION

Figure 1:
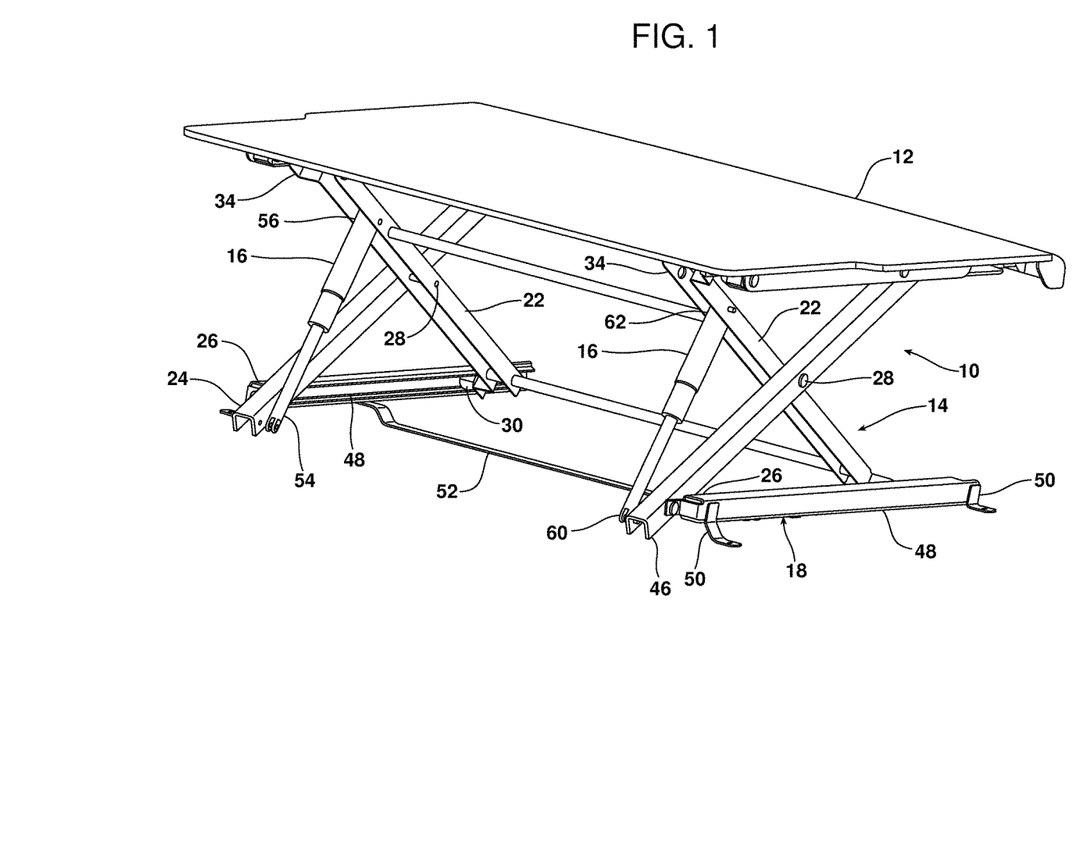
FIG. 1 is a rear perspective view of a lift mechanism for a utility vehicle storage area in an elevated position.

Reference is now made to FIG. 1 which broadly illustrates an embodiment of a lift assembly 10 having a removable floor 12. The floor 12 is supported by a scissor mechanism 14 which is raised from a neutral (or lowered) position to an elevated position by an actuator 16. Scissors mechanisms utilize linked, folding supports in a criss-cross or "X" pattern which are typically attached to a base. Extension is achieved by applying pressure to an outside pair of supports located at one end of the mechanism thereby elongating the crossing pattern. The applied pressure can be achieved through hydraulic, pneumatic, mechanical, or simply muscular means. Of course, the supports and base can be manufactured of metals, plastics, and other materials and can take many shapes to accommodate particular design requirements or features.

Figure 2:
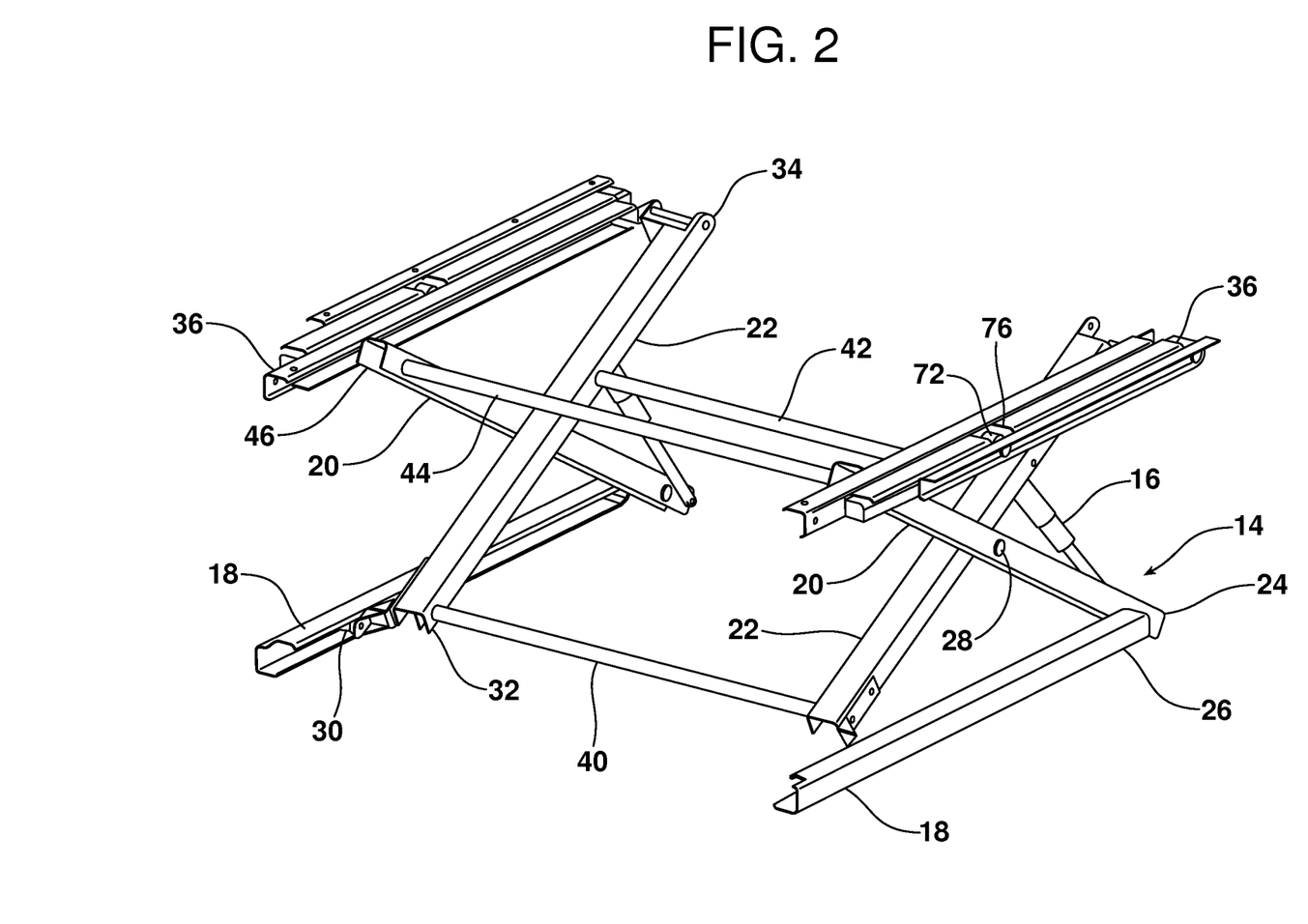
FIG. 2 is a front perspective view of a lift mechanism for a utility vehicle storage area in an elevated position with the floor removed.

As shown in FIG. 2, the scissor mechanism 14 includes two pairs of first and second pivotally connected supports 20, 22, and a base 18. The first and second pivotally connected supports 20, 22 and base 18 are manufactured from a lightweight extruded aluminum in the described embodiment. The first supports 20 are attached adjacent a first end 24 to the base 18. More specifically, the first supports 20 are attached to a rear area 26 of the base 18. Similarly, the second supports 22 are pivotally connected to the first supports 20 at pivot point 28 creating an X-type configuration. A roller 30 is attached adjacent a first end 32 of each of the second supports 22. The rollers 30 are confined within the base 18 for movement therein as will be described in more detail below. In another embodiment, a member (not shown) may replace the roller. The member may be spherical shaped, semi-spherical shaped, flat or generally any shape so long as the member is capable of moving along the base. A second end 34 of the second supports 22 is pivotally attached to guide members 36 to allow the scissor mechanism 14 to be raised and lowered.

One or more lateral cross braces 38 may also be utilized. In the described embodiment, lateral tubular cross braces 38 extend between pairs of first and second pivotally connected supports. A first lateral brace 40 is attached adjacent the first ends 32 of the second supports 22 near the rollers 30. A second lateral brace 42 is attached to the second supports 22 at a position between the pivot point 28 formed by the first and second supports and the second end of the second support 34. As will be described below, the second lateral brace 42 is attached near an attachment point of the actuator 16. A third lateral brace 44 is attached adjacent the second ends 46 of the first supports 20 near the guide members 36 and floor 12 (not shown in this figure). Of course, additional or fewer braces may be utilized depending on any number of factors, for example, the overall dimensions of the lift mechanism or the expected loads on the floor.

In the described embodiment, the base 18 includes a pair of guide members 48, as shown in FIG. 1, which may be secured to a frame of the utility vehicle. In the described embodiment, angle brackets 50 are attached to ends of the base 18 and bolted to the vehicle. A lateral brace 52 extending between base guide members 48 may also be utilized. As shown, the lateral brace 52 may likewise be bolted to the vehicle adjacent the base guide members 48 and may be formed to extend into the wheel well of the vehicle to deter any shifting of the base 18 during use. Of course other methods for securing the base to the vehicle and deterring shifting may be used in accordance with the broad teachings herein. The guide members 48 of the described base are C-shaped channels within which the scissor mechanism rollers 30 are allowed to move. The C-shaped channels 48 limit the rollers 30 to a linear direction forcing the scissor mechanism 14 to be raised and lowered.

The actuator 16 is pivotally attached at its first end 54 to a first end of the first support 24 at the rear of the base 26.

A second end 56 of the actuator 16 is likewise pivotally attached to the second support 22 at a position between the pivot point 28 formed by the first and second supports and the second end of the second support 34. As the actuator 16 extends, the second end 56 of the actuator forces the second support 22 upward while the first end 54 of the actuator rotates about its pivotal attachment to the first end of the first support 24. Raising the second support 22 necessarily raises the first support 20 thereby raising the floor 12. In reverse manner, as the actuator 16 retracts, the second end of the actuator 56 pulls the second support 22 downward reversing the upward movement described above.

Figure 3:
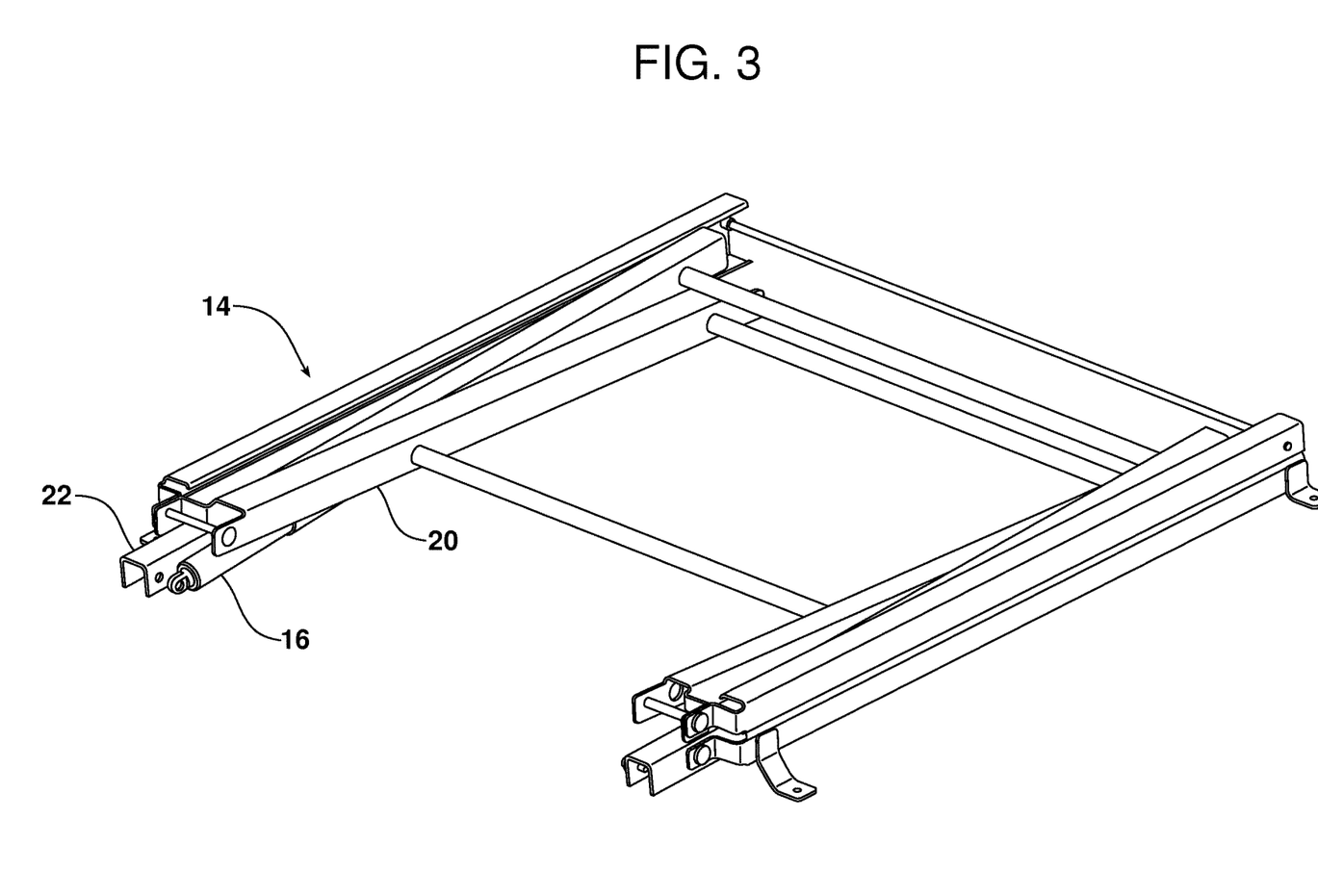
FIG. 3 is a rear perspective view of a lift mechanism for a utility vehicle storage area in a neutral position with the floor removed.

As shown in FIG. 3, the actuator 16 may be retracted to a fully retracted position wherein the scissor mechanism 14 is substantially flat. This is the neutral or lowered position. In this position, the actuator 16 is positioned substantially or completely within the first support 20. The first and second supports 20, 22 in the described embodiment are generally U-shaped channels which provide structural integrity while maintaining a light weight. As shown in FIG. 1, the actuator 16 is pivotally secured within the U-shaped channel of the second support 22. In this manner, the actuator 16 is received within the U-shaped channel of the second support 22 as the scissor mechanism 14 is lowered to the neutral position and does not hinder the range of motion of the scissor mechanism.

As is best shown in FIG. 1, a second actuator 16 is attached to the second pair of supports to provide additional stability during operation of the scissor mechanism 14. More specifically, a first end of the second actuator 60 is pivotally attached to a second end of the first support 46 at the rear of the base 26. A second end of the second actuator 62 is likewise pivotally attached to the second support 22 at a position between the pivot point 28 formed by the first and second supports and the second end of the second support 34. As the actuator 16 extends, the second end of the strut 62 extends with the second support 22 upward while the first end of the actuator 60 rotates about its pivotal attachment to the first end of the first support 24. As before, the actuator 16 is pivotally secured within a U-shaped channel of the second support 22. In this manner, as the scissor mechanism 14 is lowered to the neutral position, the strut is positioned within the U-shaped channel of the second support and does not hinder the range of motion of the scissor mechanism.

Figure 4:
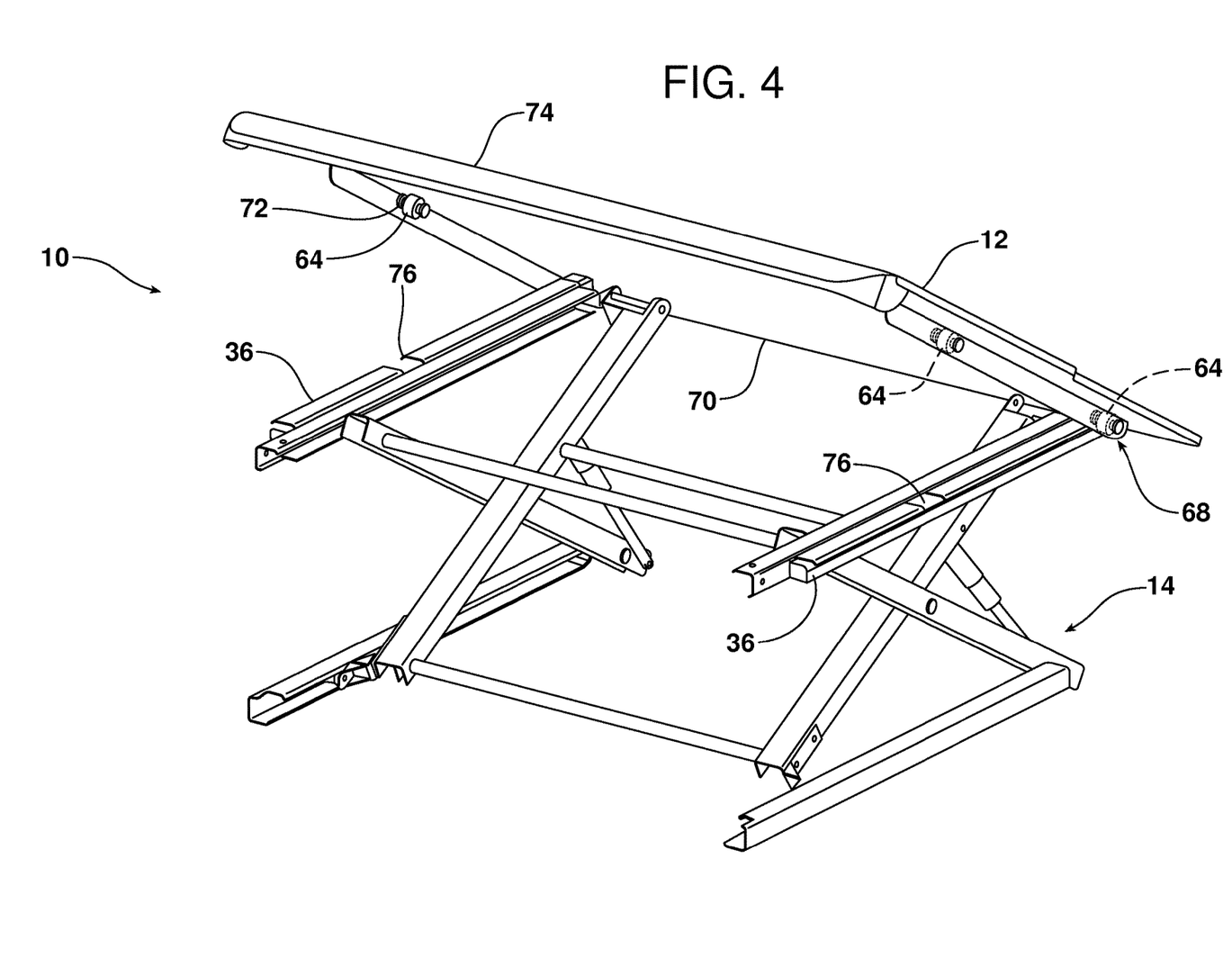
FIG. 4 is the same as FIG. 2 except the floor is shown in a pivoted position.

As best shown in FIG. 4, a plurality of rollers 64 are attached to an underside of the floor 12 for engagement with guide members 36 attached to the scissor mechanism 14. In the described embodiment, four rollers 64 are attached to the underside of the floor. Specifically a first pair of rollers 68 is attached adjacent a rear edge 70 of the floor 12 and a second pair of rollers 72 attached between a front edge 74 of the floor and the rear edge of the floor. The rollers 64 are generally positioned and secured within the guide members 36, or channels, within which the rollers are limited to movement along a linear direction.

The guide members 36 are attached to the scissor mechanism 14 for movement therewith and in the described embodiment include cutouts 76 positioned between the front edge 74 and the rear edge 70 of the floor. Specifically, as best shown in FIG. 2, the cutouts 76 are positioned adjacent the second pair of rollers 72. This allows the second pair of rollers 72 to pass through the cutouts 76 when the floor 12 is rotated to a pivoted position as shown in FIG. 4.

Figure 5:
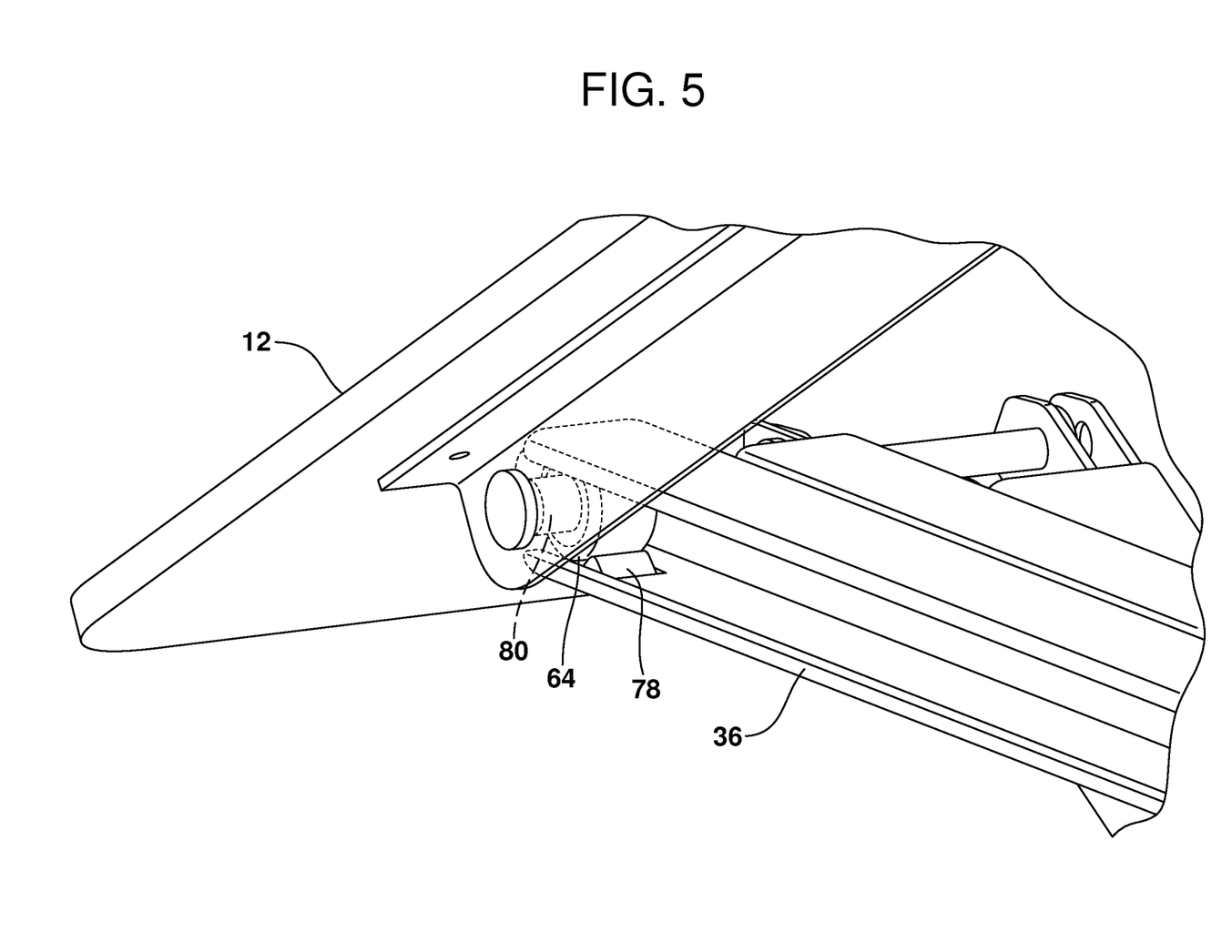
FIG. 5 is a partial perspective view of the lift mechanism for a utility vehicle storage area with the floor shown in a pivoted position and rotated about a pivot point created by a roller and a detent protruding into a guide member and contacting the roller.

As shown in FIG. 5, a detent 78 protrudes into one of the guide members 36 preventing rotation of the roller 64. A detent is a device used to mechanically resist or arrest the rotation of a wheel, roller, or axle. Such a device can be anything ranging from a simple metal pin to a machine. The detent 78 in the described embodiment is a spring detent but, as noted, the detent may take any form sufficient to resist or arrest the rotation of the roller 64. Even more, a second detent (not shown) may be utilized in like manner in association with a second roller 64.

As shown, the roller 64 is positioned adjacent the detent 78 which prevents rotation thereof and locks the floor 12 into a neutral or fully installed position. This prevents movement of the floor 12 due to cargo shifting, particularly when the vehicle is in transit. In this neutral position, the second pair of rollers 72 is adjacent the cutouts 76 in the guide members 36 allowing the second pair of rollers to pass through the cutouts as the floor 12 pivots upward. Pivoting of the floor in this manner can take place when the floor is in the neutral position, the elevated position, or any position between the neutral and elevated positions. Even more, holding the roller 64 in the neutral position such that the roller is in a position near a rear of the guide member 36 allows the floor 12 to pivot around the roller 64 to a pivot position. Forming a pivot point 80 utilizing a roller 64 attached to the floor allows for the removal of the floor when desired. Removal is accomplished by pivoting the floor 12 so the second pair of rollers 72 pass through the guide member cutouts 76 and pulling the floor in a direction out of the vehicle until the first pair of rollers 68 are adjacent the guide member cutouts. Lifting the floor 12 such that the first pair of rollers 68 pass through the guide member cutouts 76 frees the floor from the lift assembly 10.

Installation of the floor 12 is an easy, reverse process wherein the first pair of rollers 68 are positioned over the guide member cutouts 76 and allowed to enter the guide members 36. Applying a rearward force to the floor 12 moves the first pair of rollers 68 along the guide members 36 until the second pair of rollers 72 is positioned adjacent the guide member cutouts 76. Allowing the second pair of rollers 72 to enter the guide members 36 and applying additional rearward force overcomes the detent 78 from a front side allowing the first pair of rollers 68 to be seated on a rear side of the detent in the neutral or fully installed position.

Figure 6:
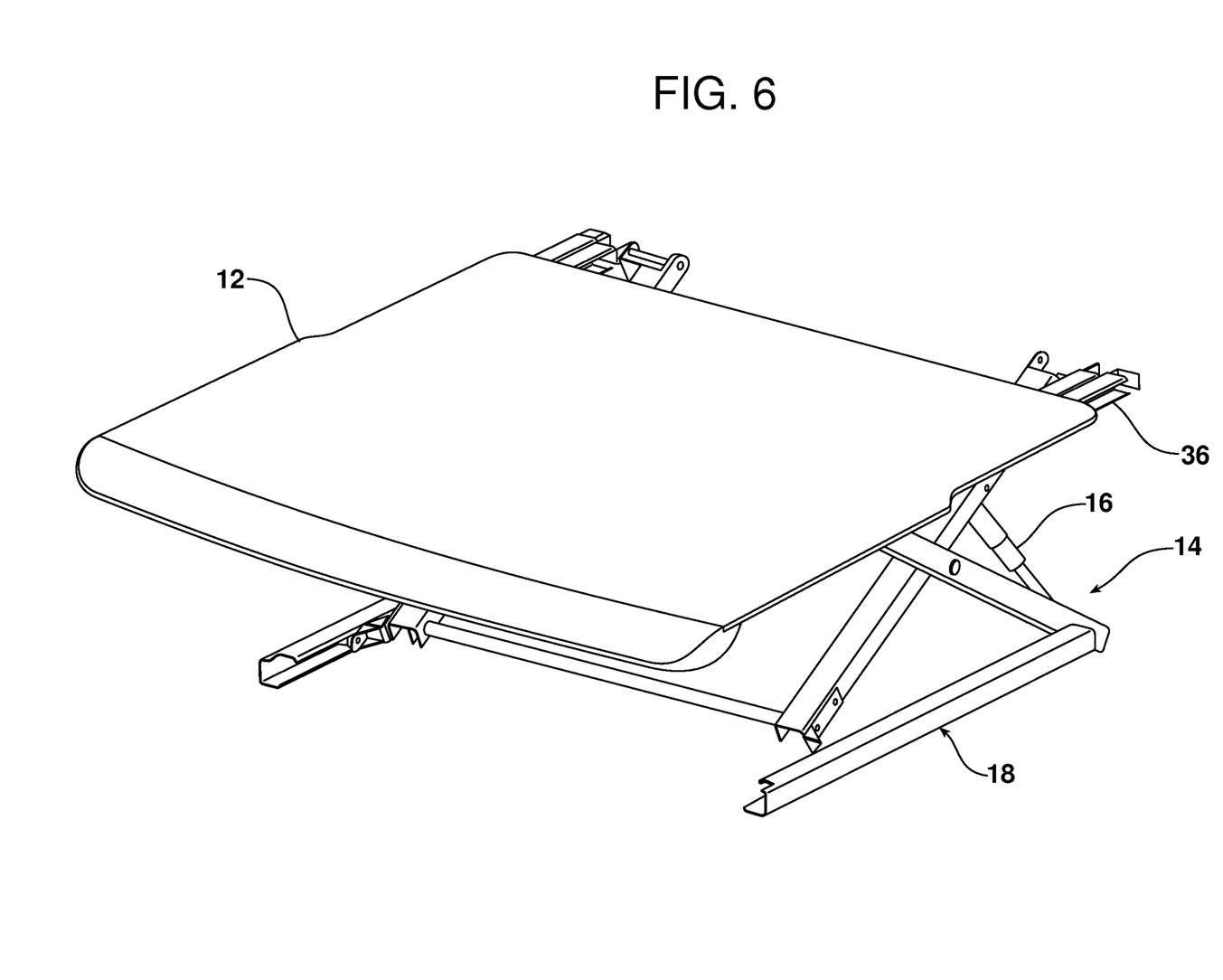
FIG. 6 is the same as FIG. 2 except the floor is shown in a position between a neutral (or lowered) position and an elevated position.

In order to move the floor 12 to the extended position shown in FIG. 6, a force is applied to the floor sufficient to overcome the detent 78 allowing the plurality of rollers 64 to move linearly within the guide members 36. The floor 12 can be extended to any length which, in the described embodiment, is limited by the length of the guide member 36. Other embodiments may include one or more additional detents or an intermediate stop between the neutral position and a fully extended position. It is important to note that the floor can be extended from the neutral position, the elevated position, or any position between the neutral and elevated positions.

In another embodiment, the lift assembly 10 for a utility vehicle described above and all of the described variations thereof are incorporated into a utility vehicle (not shown).

Figure 7A:
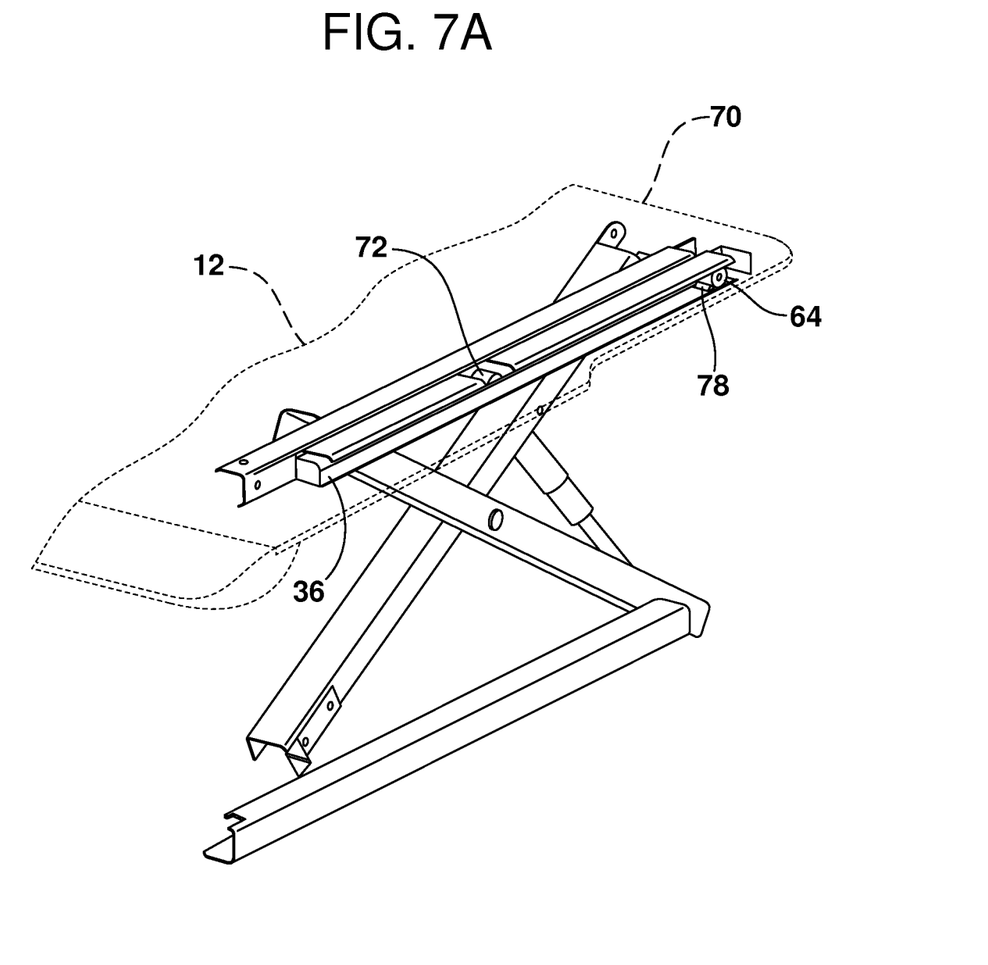
FIG. 7A is a partial perspective view of the lift mechanism for a utility vehicle storage area with the floor shown in a neutral position and a first roller adjacent a detent protruding into a guide member and a second roller adjacent a cutout in the guide member to facilitate removal of the floor.
Figure 7B:
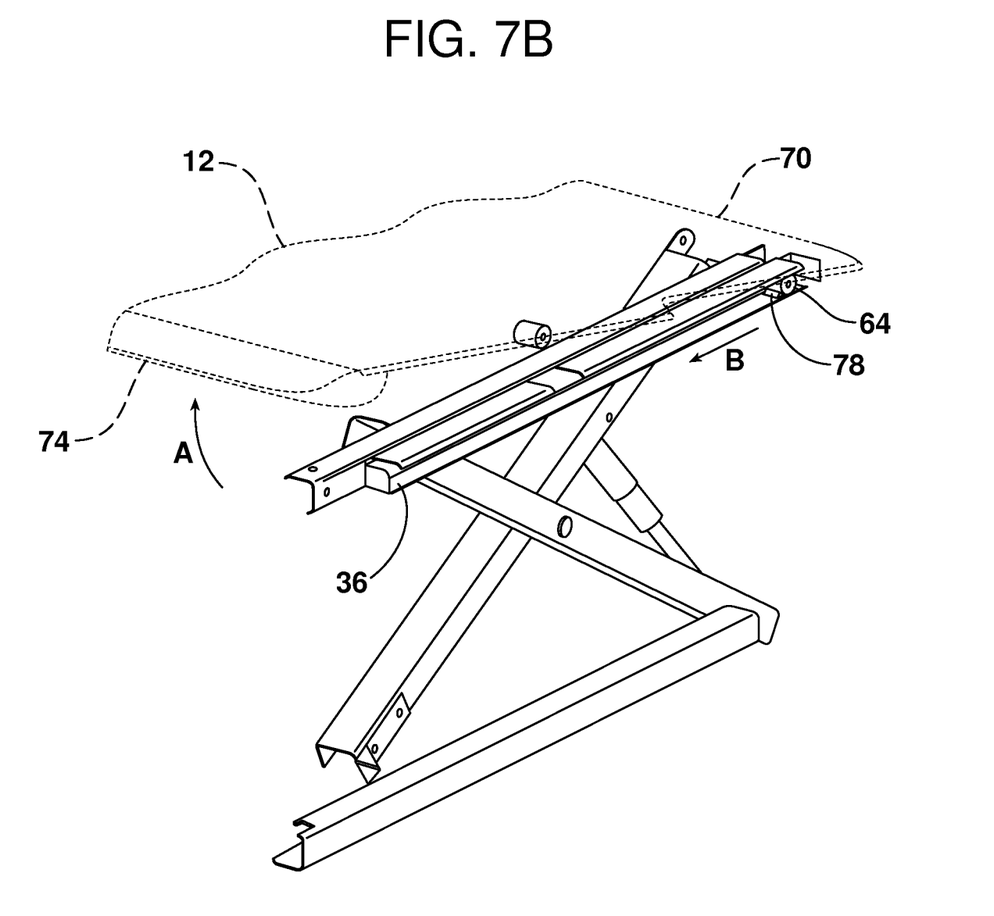
FIG. 7B is a partial perspective view of the lift mechanism for a utility vehicle storage area with the floor shown in a pivoted position with the first roller adjacent the detent and a second roller passed through the cutout in the guide member.
Figure 7C:
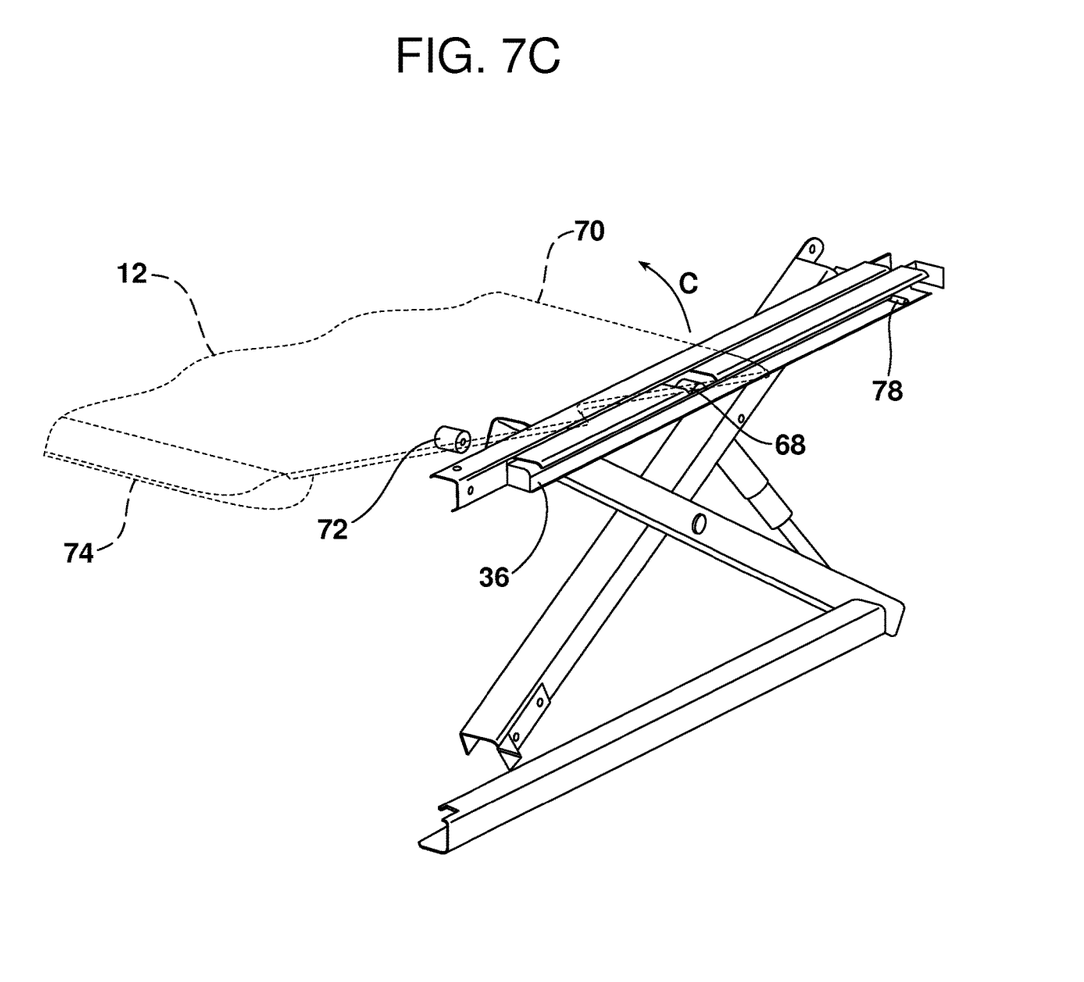
FIG. 7C is a partial perspective view of the lift mechanism for a utility vehicle storage area with the floor shown in an extended position with the first roller having overcome the detent and positioned adjacent the cutout in the guide member to facilitate removal of the floor.

In another aspect of the invention, a method of removing a floor 12 from a lift assembly 10 of a utility vehicle storage area is illustrated in FIGS. 7A-7C. In the first step shown in FIG. 7A, a scissor mechanism 14 supporting the floor 12 is actuated to move the floor to a removal position. The removal position can be the neutral or fully installed position, the elevated position, or any position between the neutral and elevated positions. This allows the vehicle operator or service technician to adjust the height of the floor dependent upon the user's height, desired method of lifting the floor, or other factors.

In the removal position, the vehicle operator or service technician pivots the floor 12 to a pivoted position. This is accomplished by lifting the front edge of the floor 74 allowing the second pair of rollers 72 to pass through the guide member cutouts 76 as shown by action arrow A in FIG. 7B. Once the floor 12 is in the pivoted position and the front edge 74 lifted freeing the second pair of rollers 72, a force is applied to the floor sufficient to release the roller 64 from the detent 78.

As described above, this allows the floor 12 to be pulled in a direction out of the vehicle as shown by action arrow B in FIG. 7B. In accordance with the method, the pulling force is maintained until the first pair of rollers 68 is adjacent the guide member cutouts 76. A rear edge of the floor 70 can then be lifted as shown by action arrow C in FIG. 7C such that the first pair of rollers 68 pass through the guide member cutouts 76 thereby freeing the floor 12 from the lift assembly 10. The floor 12 can then be set aside during servicing of the vehicle, accessing the spare tire and related tools, or throughout a trip in which the entirety of the storage area is desired for cargo.

In another aspect of the method of removing the floor 12 from the lift assembly 10 of the utility vehicle storage area, the scissor mechanism 14 may be braced utilizing at least one lateral support 38 as shown in FIG. 2. In the above described embodiment, three lateral supports 40, 42, 44 are used to brace the scissor mechanism 14.

Re-installation of the floor 12 is an easy, reverse process wherein the floor is positioned such that the first pair of rollers 68 are over the guide member cutouts 76. The floor 12 is lowered allowing the first pair of rollers 68 to enter the guide members 36. Applying a rearward force to the floor 12 moves the first pair of rollers 68 along and within the guide members 36 until the second pair of rollers 72 is positioned adjacent the guide member cutouts 76 in a pivoted position. Allowing the second pair of rollers 72 to enter the guide members 36 and applying additional rearward force overcomes the detent 78 from a front side thereof allowing the first pair of rollers 68 to be seated on a rear side of the detent in the removal position. As noted above, the removal position can be the neutral or fully installed position, the elevated position, or any position between the neutral and elevated positions depending on the position of the scissor mechanism 14. Again, this allows the vehicle operator or service technician to adjust the height at which the floor 12 will be re-installed dependent upon the user's height, desired method of lifting the floor, or other factors.

In summary, numerous benefits result from providing a lift assembly 10 for a utility vehicle that can be removed from the assembly and vehicle if desired. The particular design allows for easy removal of the floor 12 without the need for tools or dismantling of the assembly. Advantageously, this allows for the entirety of the storage area to be used, easier access to the spare tire and related tools, and easier access to the underlying wiring and systems during service of the vehicle.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A lift assembly for a utility vehicle storage area, comprising:

a floor supported by a scissor mechanism;

an actuator for raising said scissor mechanism and said floor from a neutral position to an elevated position;

a plurality of rollers attached to an underside of said floor, said plurality of rollers include a first pair of rollers attached adjacent a rear edge of said floor and a second pair of rollers attached apart from said first pair of rollers between a front edge and the rear edge of said floor;

guide members attached to said scissor mechanism and within which said plurality of rollers move; and a detent protruding into one of said guide members to resist rotation of at least one of said plurality of rollers and create a pivot point about which said floor rotates to a pivoted position, wherein said guide members include a cutout through which said second pair of rollers pass when said floor is rotated to the pivoted position.

2. The lift assembly for a utility vehicle storage area of claim 1, wherein said floor rotates to the pivoted position from the neutral position, the elevated position, or any position between the neutral and elevated positions.

3. The lift assembly for a utility vehicle storage area of claim 2, wherein said scissor mechanism includes at least one lateral cross brace.

4. The lift assembly for a utility vehicle storage area of claim 1, wherein said first pair of rollers also passes through said cutouts when removing said floor from the lift assembly.

5. The lift assembly for a utility vehicle storage area of claim 1, wherein said first and second pairs of rollers are positioned within said guide members, and said at least one of said plurality of rollers is in contact with said detent and said second pair of rollers is adjacent said cutouts, in the neutral position and the elevated position.

6. The lift assembly for a utility vehicle storage area of claim 1, wherein said scissor mechanism includes a pair of first and second pivotally connected supports, and a base, said first supports attached adjacent a first end to said base and attached adjacent a second end to said guide member, and said second supports having a member attached adjacent a first end for movement along said base and attached adjacent a second end to said guide member.

7. The lift assembly for a utility vehicle storage area of claim 6, wherein said base includes a pair of elongated channels, and said member attached adjacent the first end of said second supports is a roller which moves within said elongated channels.

8. The lift for a utility vehicle storage area of claim 6, wherein at least one of said first and second pivotally connected supports includes a channel within which at least a portion of said actuator is positioned in the neutral position.

9. The lift assembly for a utility vehicle storage area of claim 6, wherein said floor rotates to the pivoted position from the neutral position, the elevated position, or any position between the neutral and elevated positions.

10. The lift assembly for a utility vehicle storage area of claim 6, wherein said scissor mechanism includes at least one lateral cross brace.

11. The lift assembly for a utility vehicle storage area of claim 6, wherein said plurality of rollers are attached to an underside of said floor including a first pair of rollers attached adjacent a rear edge of said floor and a second pair of rollers attached between a front edge and the rear edge of said floor.

12. The lift assembly for a utility vehicle storage area of claim 11, wherein said guide members include a cutout through which said second pair of rollers pass when said floor is rotated to the pivoted position.

13. The lift assembly for a utility vehicle storage area of claim 12, wherein said first and second pairs of rollers pass through said cutouts when removing said floor from the lift assembly.

14. A utility vehicle incorporating the storage area lift assembly of claim 1.

15. A method of removing a floor from a lift assembly of a utility vehicle storage area, comprising the steps of:

actuating a scissor mechanism supporting said floor to move said floor to a removal position;

pivoting said floor from the removal position to a pivoted position;

applying a force to said floor sufficient to release a roller attached adjacent a rear edge of said floor and positioned within a guide member attached to said scissor mechanism from a detent;

maintaining the force until said roller is adjacent a cutout in said guide member; and lifting a rear edge of said floor such that said attached roller passes through the cutout in said guide member.

16. The method of removing a floor from a lift assembly of a utility vehicle storage area of claim 15, wherein the step of pivoting includes lifting a front edge of said floor such that a second roller attached between a front edge and the rear edge of said floor passes through the cutout in said guide member prior to the step of applying a force.

17. The method of removing a floor from a lift assembly of a utility vehicle storage area of claim 16, further comprising the step of bracing said scissor mechanism with at least one lateral support.

18. A lift assembly for a utility vehicle storage area, comprising:

a floor supported by a scissor mechanism;

an actuator for raising said scissor mechanism and said floor from a neutral position to an elevated position;

a plurality of rollers attached to said floor;

guide members attached to said scissor mechanism and within which said plurality of rollers move; and a detent protruding into one of said guide members to resist rotation of at least one of said plurality of rollers and create a pivot point about which said floor rotates to a pivoted position, wherein said scissor mechanism includes a pair of first and second pivotally connected supports, and a base, said first supports attached adjacent a first end to said base and attached adjacent a second end to said guide member, and said second supports having a member attached adjacent a first end for movement along said base and attached adjacent a second end to said guide member, and at least one of said first and second pivotally connected supports includes a channel within which at least a portion of said actuator is positioned in the neutral position.

19. The lift assembly for a utility vehicle storage area of claim 18, wherein said floor rotates to the pivoted position from the neutral position, the elevated position, or any position between the neutral and elevated positions.

20. The lift assembly for a utility vehicle storage area of claim 18, wherein said guide members include a cutout through which said second pair of rollers pass when said floor is rotated to the pivoted position.

* * * * *